United States Patent [19]
Hemsen

[11] Patent Number: 5,553,829
[45] Date of Patent: Sep. 10, 1996

[54] SOLENOID VALVE WITH SOUND DAMPENING FEATURE

[75] Inventor: Steven J. Hemsen, Southington, Conn.

[73] Assignee: Honeywell Inc., Minneapolis, Minn.

[21] Appl. No.: 378,207

[22] Filed: Jan. 25, 1995

[51] Int. Cl.$^6$ ............................................. F16K 31/02
[52] U.S. Cl. ................. 251/129.21; 251/64; 251/129.19; 137/625.65
[58] Field of Search ................. 251/64, 129.15, 251/129.19, 129.21; 137/625.65

[56] References Cited

U.S. PATENT DOCUMENTS

| | | | |
|---|---|---|---|
| 2,868,494 | 1/1959 | Kearns, Jr. et al. | 251/64 |
| 3,324,889 | 6/1967 | Batts | 251/129.21 |
| 3,446,473 | 5/1969 | Barker | 251/64 |
| 4,523,739 | 6/1985 | Johansen et al. | 251/129.21 |
| 4,531,708 | 7/1985 | Livet | 251/129.21 X |
| 5,127,627 | 7/1992 | Domke | 251/129.15 |
| 5,374,029 | 12/1994 | Bailey | 251/129.21 X |

Primary Examiner—John Rivell
Attorney, Agent, or Firm—William D. Lanyi

[57] ABSTRACT

A noise dampening feature is provided to a valve by incorporating an annular resilient member in association with the plunger of a solenoid valve. The annular resilient member comprises an annular portion and a series of protrusions extending axially away from the annular portion. A plunger of a solenoid valve is adapted to have an annular groove into which the annular portion of the resilient member is received. By preventing the direct physical contact of the upper surface of the plunger with the lower surface of a stop member, the resilient member prevents the clicking noise that is undesirable in certain circumstances. In order to avoid restricting the normal flow of fluid through the valve, the resilient member is provided with a plurality of protrusions and recesses, or interstitial spaces, that allows fluid to flow radially inward from the region of the fluted sides of the plunger toward the central location of a secondary port formed through a stop member.

17 Claims, 4 Drawing Sheets

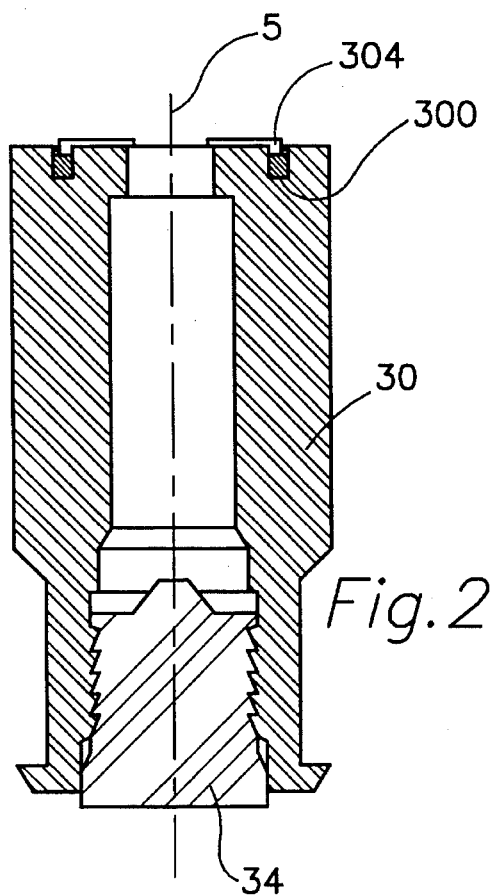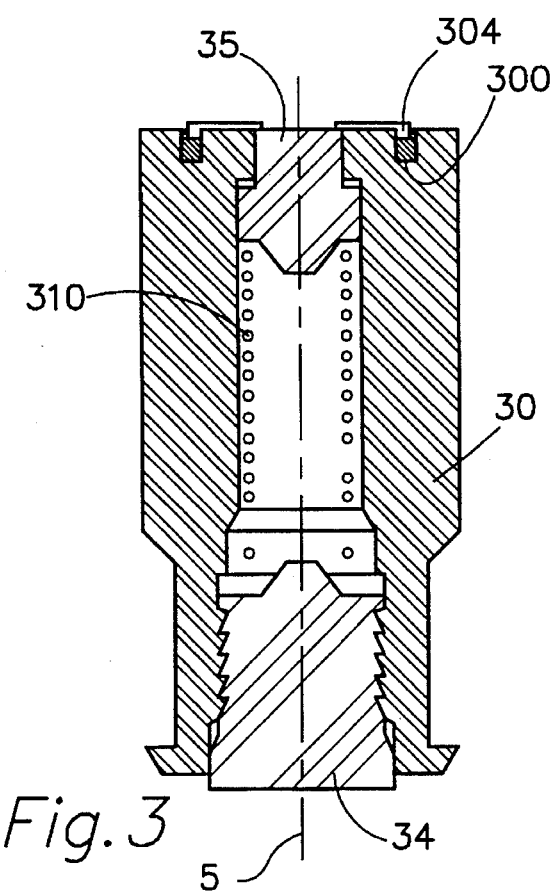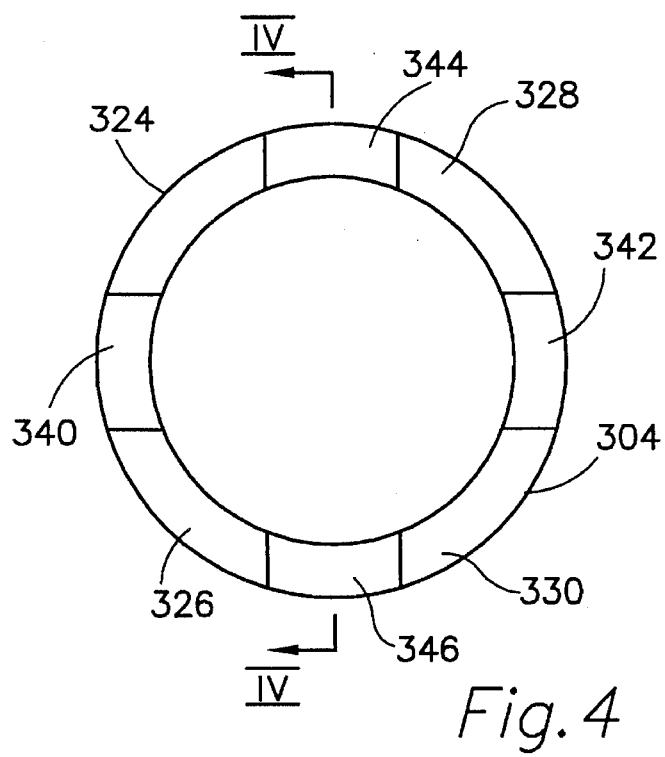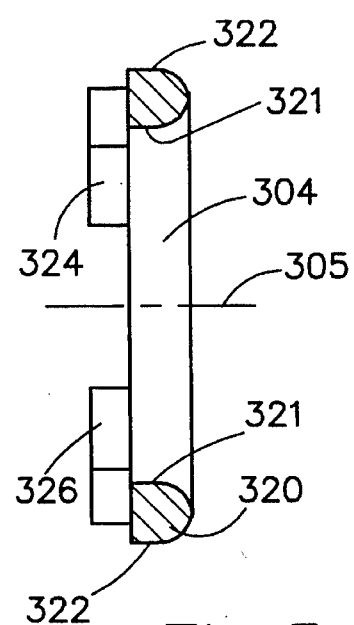

SOLENOID VALVE WITH SOUND DAMPENING FEATURE

BACKGROUND OF THE INVENTION

1. Field of the Invention

The present invention is generally related to a valve and, more specifically, to a solenoid valve that is provided with a sound dampening feature which comprises a resilient member attached to a moveable plunger which dampens the impact between a moveable plunger and a fixed stop member and, in certain cases, prevents direct contact between these components.

2. Description of the Prior Art

Many different types of solenoid valves are well known to those skilled in the art. In a typical application of a solenoid valve, a metal plunger is slidably disposed along a central axis within a central cavity of a solenoid coil. When the solenoid coil is energized, the magnetic flux generated by the coil caused the plunger to move axially along the centerline of the solenoid coil. Typically, the plunger is provided with a resilient seal member that moves into blocking association with a fluid port. In some applications of solenoid valves, the plunger is provided with a second resilient seal member that moves into blocking association with another fluid port in alternating synchronization with the first resilient seal. In other words, when the plunger is caused to move in a first direction, a first seal blocks a first fluid conduit and when the plunger is caused to move in the opposite direction, a second seal blocks a second fluid conduit. However, it should clearly understood that many solenoid valves are used in conjunction with a single resilient seal and a single fluid conduit.

U.S. Pat. No. 5,127,627, which issued to Domke on Jul. 7, 1992, discloses a solenoid valve that comprises a threaded sleeve assembly. Although the present invention is not directly related to the threaded sleeve assembly structure, the Domke patent describes the operation of solenoid valves and discusses the type of structure in which the present invention is intended to operate. U.S. Pat. No. 5,127,627 is expressly incorporated by reference in this application.

The Domke patent discloses an improved solenoid valve wherein the improvement is a modified sleeve assembly. The sleeve assembly is a tubular section having an enlarged first end integrally formed with the remainder of the tubular section and having a second end. The enlarged end is formed with external threads which mate with threads of a cup-like recess in the body of the solenoid valve. The tubular section is a nonmagnetic material which is screwed into the cup-like recess of the body. The enlarged first end further has a gasket seal for compressing a gasket between the cup-like recess of the body and the sleeve member. A stop of magnetic material is welded to the section end of the tubular section forming a seal. A flux plate comprising a magnetic material is located about the sleeve assembly between an electrical coil and the body.

One problem that is often encountered during the operation of solenoid valves is the sound of the impact between a plunger and a mechanical stop when the plunger is moved toward the stop by the action of a solenoid coil. This is particularly troublesome in double acting valves, but could be experienced in certain designs of single acting valves. As will be described in greater detail below, the plunger can move into momentary contact with the stop member during the deformation of the resilient valve seal upon initial impact with the fluid conduit which it is intended to block. This momentary impact can cause a clicking sound. It would therefore be beneficial if a valve could be provided which eliminates or significantly reduces the clicking sound without adversely affecting the flow of fluid through the valve.

SUMMARY OF THE INVENTION

The present invention is directed to providing a valve which eliminates, or significantly dampens, the sound of the valve when its plunger moves toward an associated stop member. The valve of the present invention comprises a sleeve assembly having a central axis. A plunger is slidably disposed within the sleeve assembly and a means is provided for causing the plunger to move axially along the central axis. In a preferred embodiment of the present invention, the causing means is a solenoid coil disposed around the plunger and also around the central axis of the sleeve assembly. A stop member is provided with an opening formed therethrough. The plunger has a seal attached to it and the seal is configured to prevent the passage of a fluid through an opening formed in the stop member when the plunger is moved toward the stop member and the seal is moved against the opening of the stop member. The present invention also provides a resilient member that is attached to the plunger between the plunger and the stop member. The resilient member is disposed to prevent direct contact or at least dampen the impact between the plunger and the stop member when the plunger is moved toward the stop member.

In a particularly preferred embodiment of the present invention, the stop member is rigidly attached to the sleeve member and the plunger is made of metal. In addition, the causing means comprises a solenoid coil. In a typical application of the present invention, the seal is made of an elastomeric material and the plunger is shaped to permit the fluid to move axially past the plunger. This plunger shape comprises one or more fluted passages that extend axially along the outer diameter of the plunger and permit a fluid to pass through the fluted portions between the plunger and the sleeve member.

In a most preferred embodiment of the present invention, the resilient member is annular in shape and is disposed within a groove that is formed in an axial face of the plunger. The resilient member comprises a plurality of discontinuities formed therein. The discontinuities extend in a direction away from the plunger and toward the stop member. Also in a most preferred embodiment of the present invention, the resilient member is disposed around the valve seal.

The present invention provides a resilient member, or bumper, which is shaped to have a plurality of discontinuities extending upward from the resilient member and from the plunger. It appears as a circular, or annular, ring that has raised steps separated by lower steps. The general shape of the resilient member is that which is generally similar to the top portion of a castle tower. This shape provides several beneficial attributes to the present invention. The recessed portions of the resilient member permit fluid to flow more easily in a radially inward direction along the top of the plunger and toward the opening in the stop member when the plunger is moved away from the stop member. If the discontinuities were not provided, the solid resilient member would extend into the space between the plunger and the stop member and deleteriously interfere with the flow of fluid through that space. Another advantage of the design of the present invention is that, when the plunger is pushed against the stop member, the extensions of the resilient member are able to collapse and expand into the recessed discontinuities. This action, after initial contact between the resilient member and the stop member occurs, allows the plunger to more freely move the last portion of its travel toward the stop member and allow its seal member to push against the opening formed through the stop member. A solid resilient member would not permit this ease of movement after initial contact is made between the resilient member and the stop member. Another advantage of this particular design is that the annular portion of the resilient member can be disposed in an annular groove formed in the face of the plunger and the annular groove can be coined or peened over the lower portions of the resilient member to retain it within the groove.

BRIEF DESCRIPTION OF THE DRAWINGS

The present invention will be more fully understood from a reading of the Description of the Preferred Embodiment in conjunction with the drawings, in which:

FIG. 2 is a cross sectional view of a plunger of a solenoid valve made in accordance with the present invention;

FIG. 3 is a cross sectional view of a plunger such as that shown in FIG. 2 with the additional inclusion of a second valve seal;

FIGS. 4 and 5 are two alternative views of the resilient member of the present invention.

DESCRIPTION OF THE PREFERRED EMBODIMENT

Figure 1:
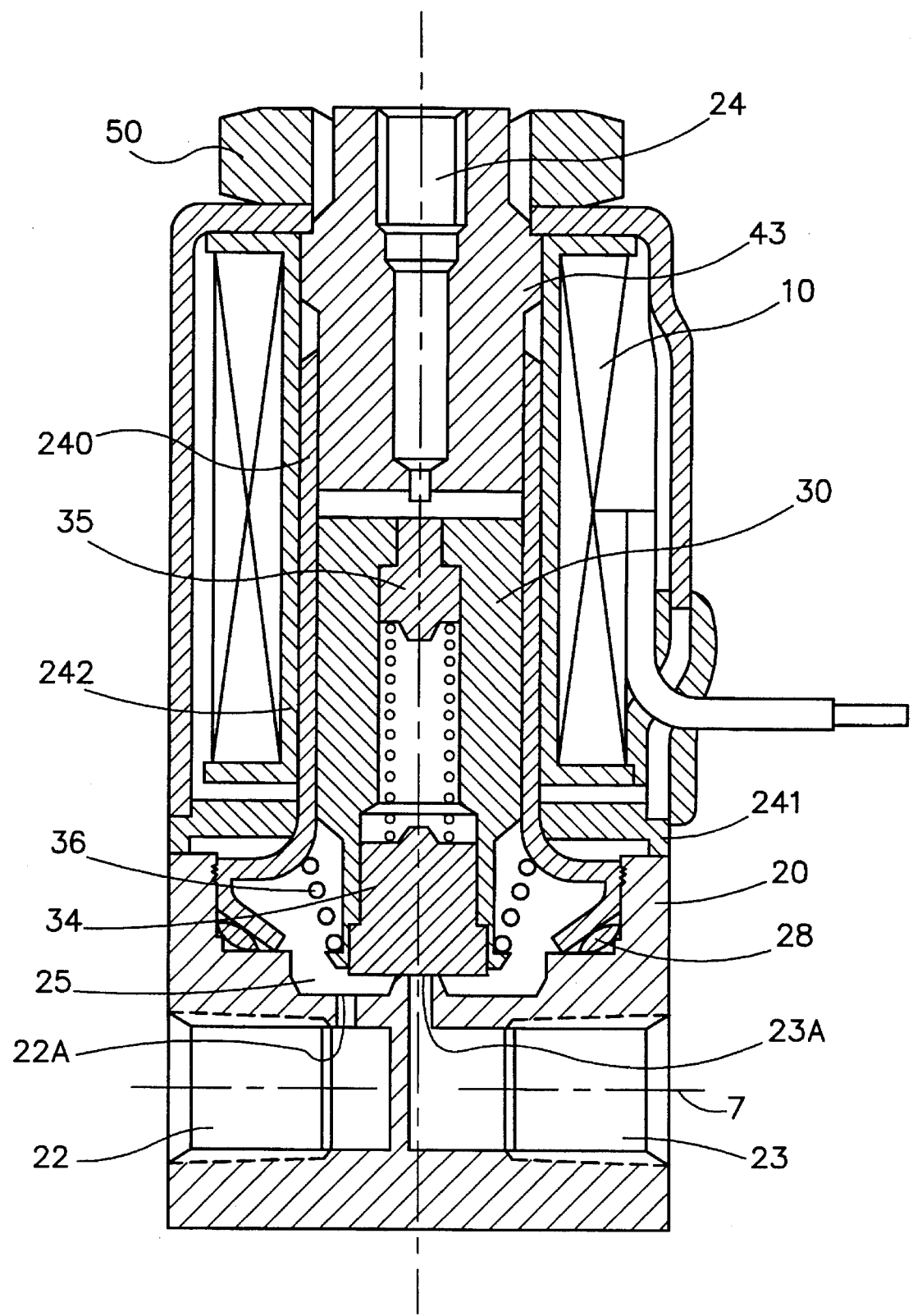
FIG. 1 illustrates a solenoid valve that is generally known to those skilled in the art.

Throughout the Description of the Preferred Embodiment, like components will be identified by like reference numerals. It should be noted that U.S. Pat. No. 5,127,624, which is explicitly incorporated by reference in this application, is closely related to the type of solenoid valve for which the present invention is particularly useful.

FIG. 1 of the present application shows a solenoid valve that is similar to that described in U.S. Pat. No. 5,127,624. A valve of this type comprises a solenoid coil 10, a valve body 20, a plunger 30 and a sleeve assembly which is identified by reference numeral 240 in FIG. 1. Within the valve body 20, an inlet port 22 and an outlet port 23 are provided. In addition, a cup-like recess 25 is formed in the valve body 20. Inlet port 22 and outlet port 23 have orifices, 22A and 23A, respectively, formed within the cup-like recess 25. Valve body 20 is generally manufactured from brass, stainless steel or plastic. Plunger 30 is located within the sleeve assembly 240. The plunger 30 is slidably disposed within the sleeve assembly 240, along central axis 5, and retained within cylinder 242. A stop member 43 limits the upward travel of the plunger 30 in FIG. 1 and the bottom boss portion surrounding orifice 23A limits the downward travel of the plunger 30. The valve body 20 and the sleeve assembly 240 are sealed by an 0-ring, or gasket 28, that is located in recess 25. The inlet port 22 is directed into the recess 25 through the inlet orifice 22A in such a way that the fluid may flow around plunger 30 and, if the solenoid coil 10 is energized, out of the outlet orifice 23A to outlet port 23.

FIG. 1 illustrates a directional control valve assembly that comprises a secondary port 24 located in the stop member 43. As can be seen, the secondary port 24 extends along axis 5 from a point external to the valve to a second point in the region directly above the plunger 30 and below the stop member 43. The present invention will be described with particular emphasis on its applicability to a valve of the type shown in FIG. 1, but it should be clearly understood that the basic concept of the present invention is adaptable to many other types and styles of valves. The sleeve member 242 has a first and second end. The first end is shown as being flared or expanded with an angular thread located about the external surface of the flared end such that sleeve number 242 will mate with the threads of cup-like recess 25 within the valve body 20. Although U.S. Pat. No. 5,127,624 is particularly directed to the shape and configuration of the sleeve member 242 shown in FIG. 1, it also describes the basic operation of solenoid valves.

With continued reference to FIG. 1, it can be seen that a downward movement of the plunger 30 relative to the sleeve assembly 240 will cause the valve seal 34 to block the outlet orifice 23A. It can also be seen that an upward movement of the plunger 30 relative to the sleeve assembly 240 will cause the valve seal 35 to block the lower end of the secondary port 24. In a valve of this type, the plunger is alternately moved up and down to successively block either the secondary port 24 or the outlet orifice 23A. The present invention is particularly directed to a valve of the type shown in FIG. 1. A common characteristic of a valve such as the one shown in FIG. 1 is that the upper face of the plunger 30 moves into momentary contact with the lower face of the stop member 43 following the initial contact of the resilient valve seal 35 with the lower end of the secondary port 24. Because of the compressible nature of the material that is typically used to provide the valve seal 35, which can be Buna-N, Viton, Ethylene Propylene or any other appropriate resilient material, a small amount of overtravel can occur during the upward movement of the plunger 30. This overtravel, which occurs after the initial contact between the valve seal 35 and the lowest portion of the stop member 43, permits the metallic upper surface of the plunger 30 to move into momentary contact with the lower surface of the stop member 43. This momentary contact can produce a clicking sound that is undesirable in many applications.

Throughout the description of preferred embodiment, it should be understood that the resilient member may or may not actually prevent direct contact between the plunger and the fixed stop member. However, the resilient member does dampen the impact between these two components. In addition, although the present invention will be specifically described in terms of its application in a three-way valve, it could also be used in association with a two-way valve.

FIG. 2 shows a plunger 30 that is generally similar to the plunger 30 shown in FIG. 1, but with the necessary adaptations to implement the concepts of the present invention. In the upper portion of the plunger 30, as illustrated in FIG. 2, an annular groove 300 is formed around axis 5. A resilient member 304 is disposed within the annular groove 300 and attached to the plunger 30. As can be seen, a portion of the resilient member 304 extends upward from the annular groove 300 and beyond the upper face of the plunger 30. Although the full shape of the resilient member 304 is not shown in FIG. 2 but will be described in greater detail below, it should be noted that a portion of the resilient member, which is illustrated by cross section in FIG. 2, lies completely below the upper axial face of the plunger 30. When this arrangement is provided, the edges of the annular groove 300 can be coined or peened to capture and permanently retain the resilient member 304 within the groove.

FIG. 3 illustrates the plunger 30 shown in FIG. 2, but with the addition of several components. The valve seal 35 is added to the inner portion of the plunger 30 and a spring 310 is provided to exert an upward force against the valve seal 35. By observing the relative positions of the valve seal 35, the upper axial face of the plunger 30 and the resilient member 304, it can be seen that the upper axial face of the plunger 30 can be prevented from striking the lower face of the stop member 43 by the resilient member 304 during the brief period of time as the valve seal 35 strikes the lower portion of the secondary port 24 and compresses because of its natural resiliency.

FIG. 4 shows a top view of a resilient member 304. Four raised portions, 324, 326, 328 and 330, extend from an annular portion of the resilient member. In between the raise portions, spaces are provided. In FIG. 4, these spaces are identified by reference numerals 340, 342, 344 and 346.

FIG. 5 is a section view of the resilient member 304 shown in FIG. 4. As can be seen, the resilient member 304 comprises an annular portion 320 which has an inner circumferential surface 321 and an outer circumferential surface 322. In addition, the section view of FIG. 5 also illustrates the relative locations of the raised portions 324 and 326 relative to the annular portion 320.

With respect to FIGS. 4 and 5, several advantages of the present invention can be seen. First, when the plunger 30 moves upward toward the stop member 43, the upper surfaces of the protrusions (e.g. those identified by reference numerals 324, 326, 328 and 330) initially move into contact with the lower axial face of the stop member 43 and can deform into the openings located between the protrusions. This provision of space for the deformation to occur allows the plunger 30 to move further upward and also permits the valve seal 35 to move into blocking relationship with the secondary port 24 without undue restriction that would otherwise be caused by a solid resilient ring. Another advantage of the present invention can also be seen in FIGS. 4 and 5. For example, the axial dimension of the annular portion 320 can be made to be less than the depth of the annular groove 300 that is shown in FIGS. 2 and 3. This permits the inner and outer edges of the annular groove 300 to be deformed in such a way that the annular portion 320 is captured within the groove. This permits an easy method for attaching the resilient member 304 to the plunger 30. Another important advantage of the present invention is that the openings, 340, 342, 344 and 346, permit fluid to flow radially inward toward the location of the lower end of the secondary port 24 and across the upper axial face of the plunger 30 without undue restriction. This is very important because, when the plunger 30 is in its downward position, there must not be any undue restriction to the fluid flow because of the provision of the resilient member. Since the total axial movement of the plunger 30 from its upper most position to its lower most position is generally very minimal, any obstruction in the passage between the upper axial face of the plunger 30 and the lower axial face of the stop member 43 would be severely deleterious to the proper operation of the valve. By providing the openings within the resilient member 304, this flow is not unduly restricted.

Figure 6:
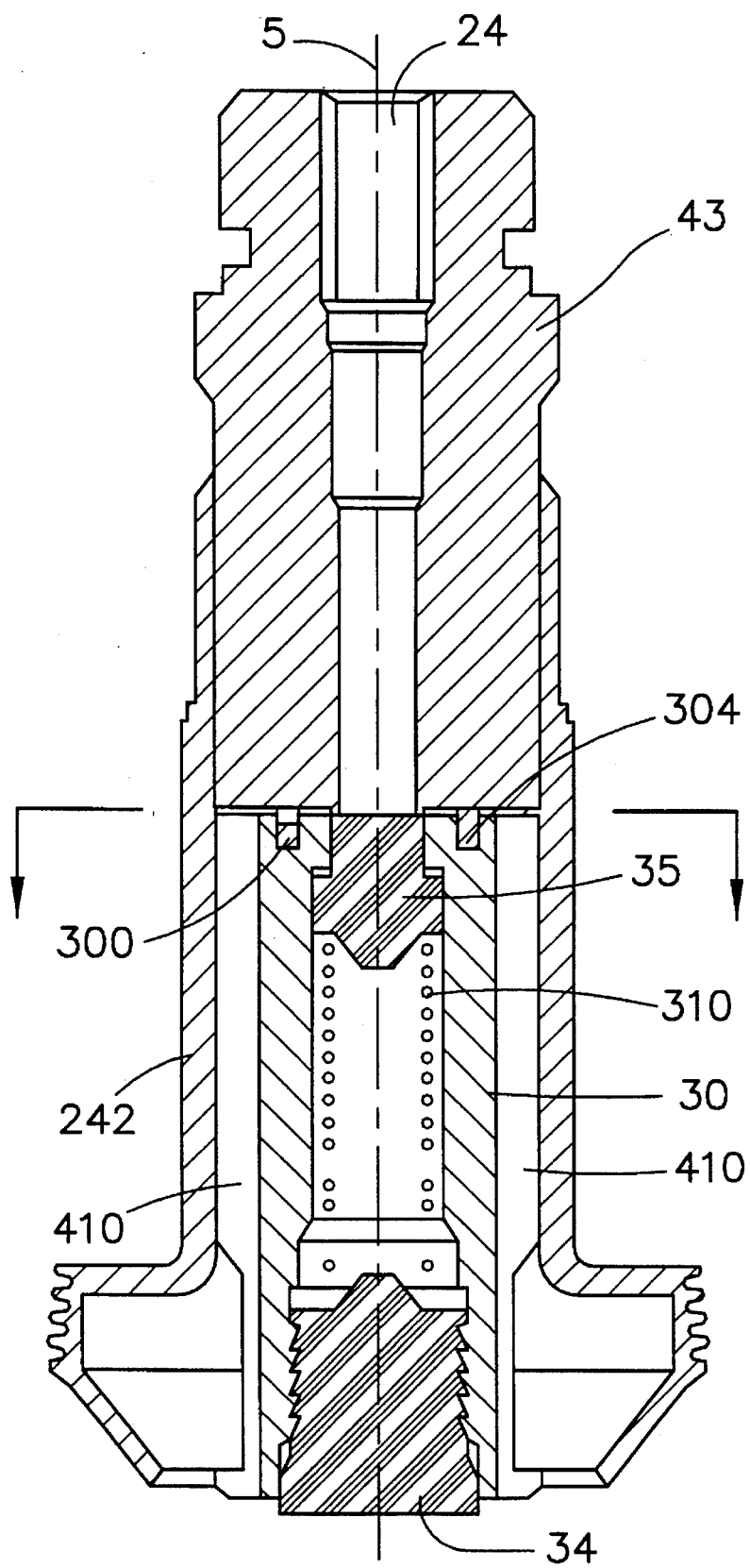
FIGS. 6 and 7 are two views of a solenoid valve portion made in accordance with the present invention.

FIG. 6 illustrates a portion of the structure shown in FIG. 1 with the addition of the resilient member 304. The sleeve member 242 described in U.S. Pat. No. 5,127,624 is illustrated in FIG. 6. However, it should be understood that the shape of the sleeve member 242 is not critical to the operation of the present invention. Within the sleeve member, the plunger 30 is positioned for travel along axis 5 between an upper most position, as illustrated in FIG. 6, and a lower most position, as illustrated in FIG. 1. The resilient member 304 is disposed within annular groove 300 as shown in FIG. 6. Two fluted portions, 410, are provided in the outer circumferential surface of the plunger 30 to assist in the passage of fluid axially upward between the plunger 30 and the sleeve member 242.

Figure 7:
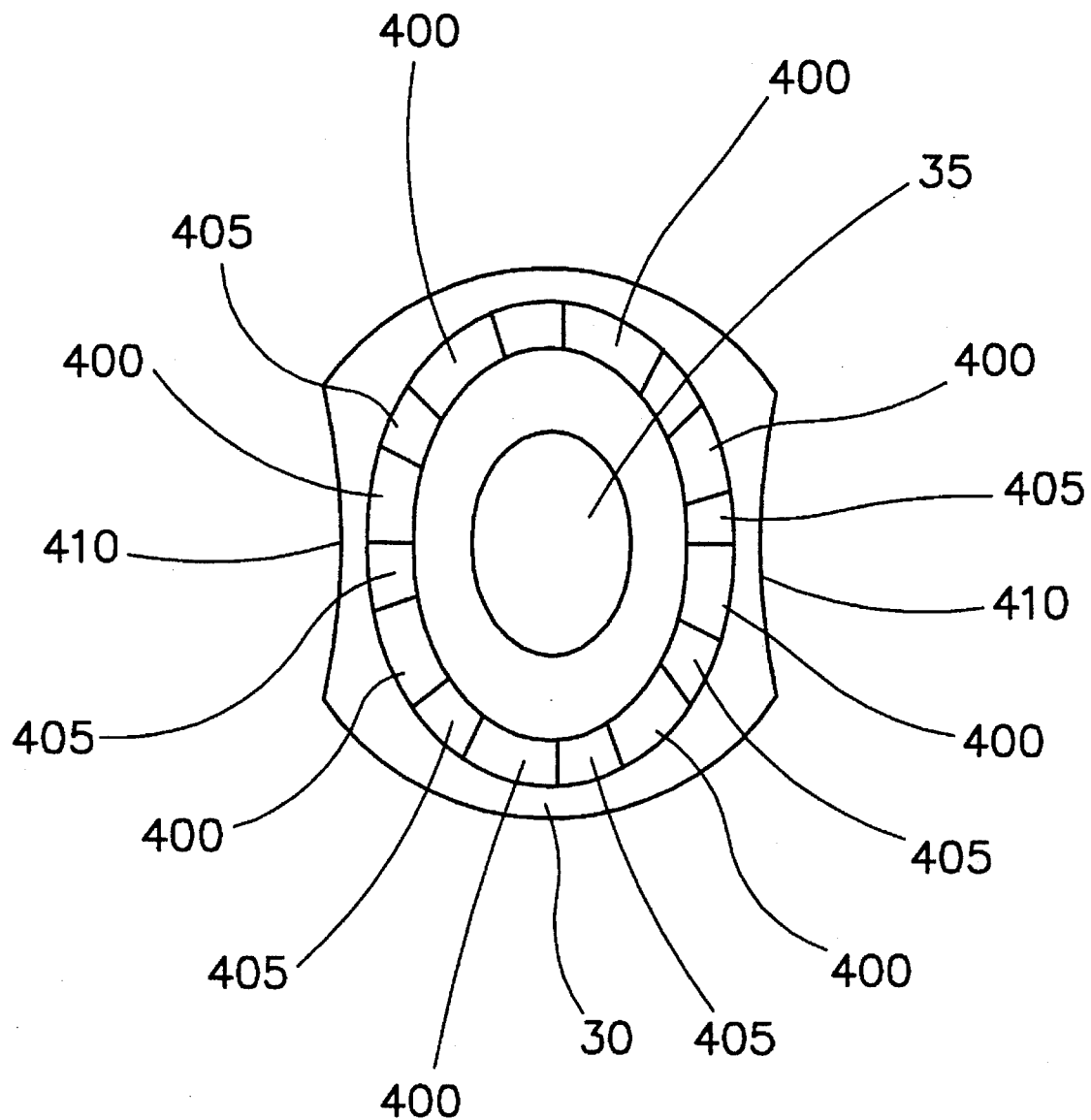

FIG. 7 is a sectional view of the device illustrated in FIG. 6. It should be noted that the resilient member 304 shown in FIGS. 6 and 7 comprises a greater number of raised portions and interstitial spaces. The present invention can utilize four raised portions and four interstitial spaces, as shown in FIGS. 4 and 5, or a greater number. For example, in FIGS. 6 and 7, eight raised portions and eight interstitial spaces are provided. The raised portions are identified by reference numeral 405 in FIG. 7 and the interstitial spaces are identified by reference numeral 400. The fluted grooves are identified by reference numeral 410 in FIGS. 6 and 7. The upper surface of the valve seal 35 is shown in FIG. 7. As can be seen, the annular groove is formed around the center of the valve seal 35. Although this relative arrangement is not an absolute requirement of the present invention, it is incorporated in a particularly preferred embodiment.

With reference to FIG. 6, it can be seen that when the plunger 30 moves upward toward the stop member 43, under the urging of the solenoid coil 10, the upper edges of the protrusions provided in the resilient member 304 move into contact with the lower axial face of the stop member 43 prior to the upper axial face of the plunger 30 being able to make contact with the stop member 43. This prevents the undesirable clicking sound that would otherwise occur while avoiding the other deleterious results that could be caused by alternative schemes of noise dampening. The present invention does not unduly block the flow of fluid in the region between the plunger 30 and the stop member 43 when the plunger 30 is moved downward away from the stop member. Furthermore, the present invention does not unduly restrict the movement of the plunger in its movement to a fully upward position. In addition, the shape of the resilient member of the present invention permits easy attachment of the resilient member to the plunger.

The three most important characteristics of the present invention are that it dampens the impact between the plunger and fixed stop member of a valve, it allows easy attachment of the resilient seal to the plunger and it allows fluid to pass through the structure of the resilient member and thereby exit through the stop port.

Although the present invention has been illustrated with particular specificity and described in detail to explain the operation of a particularly preferred embodiment, it should be understood that alternative embodiments are within its scope.

The embodiments of the invention in which an exclusive property or right is claimed are defined as follows:

1. A valve, comprising:

a sleeve assembly having a central axis;

a plunger slideably disposed within said sleeve assembly;

means for causing said plunger to move axially along said central axis;

a stop member having an opening formed therethrough, said plunger having a seal attached thereto, said seal being configured to prevent the passage of a fluid through said opening when said plunger is moved toward said stop member and said seal is moved against said opening; and a resilient member attached to said plunger between said plunger and said stop member, said resilient member being disposed to prevent direct contact between said plunger and said stop member when said plunger is moved toward said stop member, said resilient member comprising a plurality of discontinuities formed therein, said plurality of discontinuities extending in a direction away from said plunger and toward said stop member.

2. The valve of claim 1, wherein:

said stop member is rigidly attached to said sleeve member.

3. The valve of claim 1, wherein:

said plunger is made of metal; and said causing means comprises a solenoid coil.

4. The valve of claim 1, wherein:

said seal is made of an elastomeric material.

5. The valve of claim 1, wherein:

said plunger is shaped to permit said fluid to move axially past said plunger.

6. The valve of claim 1, wherein:

said resilient member is annular in shape.

7. The valve of claim 1, wherein:

said resilient member is disposed within a groove formed in said plunger.

8. The valve of claim 1, wherein:

said resilient member is disposed around said seal.

9. The valve of claim 3, wherein:

said stop member is rigidly attached to said sleeve member.

10. The valve of claim 3, wherein:

said seal is made of an elastomeric material.

11. The valve of claim 3, wherein:

said plunger is shaped to permit said fluid to move axially past said plunger.

12. The valve of claim 3, wherein:

said resilient member is annular in shape.

13. The valve of claim 3, wherein:

said resilient member is disposed within a groove formed in said plunger.

14. The valve of claim 3, wherein:

said resilient member is disposed around said seal.

15. A valve, comprising:

a sleeve assembly having a central axis;

a plunger slideably disposed within said sleeve assembly;

means for causing said plunger to move axially along said central axis;

a stop member having an opening formed therethrough, said plunger having a seal attached thereto, said seal being configured to prevent the passage of a fluid through said opening when said plunger is moved toward said stop member and said seal is moved against said opening; and a resilient member attached to said plunger between said plunger and said stop member, said resilient member being disposed to prevent direct contact between said plunger and said stop member when said plunger is moved toward said stop member, said plunger being made of metal, said causing means comprising a solenoid coil, said seal being made of an elastomeric material, said resilient member being annular in shape, said resilient member being disposed within a groove formed in said plunger, said resilient member comprising a plurality of discontinuities formed therein, said plurality of discontinuities extending in a direction away from said plunger and toward said stop member, said resilient member being disposed around said seal.

16. The valve of claim 15, wherein:

said stop member is rigidly attached to said sleeve member.

17. The valve of claim 15, wherein:

said plunger is shaped to permit said fluid to move axially past said plunger.

\* \* \* \* \*